United States Patent
Abramson et al.

(10) Patent No.: US 6,539,494 B1
(45) Date of Patent: Mar. 25, 2003

(54) INTERNET SERVER SESSION BACKUP APPARATUS

(75) Inventors: Nathan Abramson, Cambridge, MA (US); Joseph T. Chung, Boston, MA (US)

(73) Assignee: Art Technology Group, Inc., Cambridge, MA (US)

(*) Notice: Subject to any disclaimer, the term of this patent is extended or adjusted under 35 U.S.C. 154(b) by 0 days.

(21) Appl. No.: 09/335,004

(22) Filed: Jun. 17, 1999

(51) Int. Cl.$^7$ ................................................ H02H 3/05
(52) U.S. Cl. .......................................................... 714/4
(58) Field of Search .............................. 714/4, 6, 11, 13

(56) References Cited

U.S. PATENT DOCUMENTS

| | | | | |
|---|---|---|---|---|
| 5,155,678 | A | | 10/1992 | Fukumoto et al. ........... 395/425 |
| 5,634,052 | A | * | 5/1997 | Morris ........................... 707/1 |
| 5,671,350 | A | * | 9/1997 | Wood .......................... 714/15 |
| 5,675,723 | A | * | 10/1997 | Ekrot et al. ..................... 714/4 |
| 5,696,895 | A | * | 12/1997 | Hemphill et al. ............... 714/4 |
| 5,710,887 | A | | 1/1998 | Chelliah et al. ............. 395/226 |
| 5,713,017 | A | * | 1/1998 | Lin et al. ........................ 707/8 |
| 5,748,870 | A | * | 5/1998 | Tims et al. ...................... 714/4 |
| 5,781,716 | A | * | 7/1998 | Hemphill et al. ............... 714/4 |
| 5,796,934 | A | * | 8/1998 | Bhanot et al. ................... 714/4 |
| 5,812,748 | A | * | 9/1998 | Ohran et al. .................... 714/4 |
| 5,812,751 | A | * | 9/1998 | Ekrot et al. ..................... 714/4 |
| 5,813,017 | A | * | 9/1998 | Morris ........................ 707/204 |
| 5,829,019 | A | * | 10/1998 | Thompson et al. ......... 711/113 |
| 5,852,724 | A | * | 12/1998 | Glenn, II et al. ........... 709/239 |
| 5,951,694 | A | * | 9/1999 | Choquier et al. ............. 714/15 |
| 5,956,489 | A | * | 9/1999 | Andres et al. ............... 709/221 |
| 6,058,424 | A | * | 5/2000 | Dixon et al. ................. 709/226 |
| 6,076,108 | A | * | 6/2000 | Courts et al. ................ 709/227 |
| 6,141,759 | A | * | 10/2000 | Braddy ........................ 713/201 |

FOREIGN PATENT DOCUMENTS

EP    0 798 893    10/1997

OTHER PUBLICATIONS

Bacon, J. et al.: "Mobile Applications for Ubiquitous Environments," The ICL Systems Journal, GB, International Computers Limited, vol. 12, No. 2, Nov. 1997, pp. 264–287.

* cited by examiner

*Primary Examiner*—Dieu-Minh Le
(74) *Attorney, Agent, or Firm*—Hale and Dorr LLP

(57) ABSTRACT

A computer system for a web site uses three tiers of servers, web (or HTTP) servers, application servers, and backup servers. The backup servers are responsible for backing up the session data for particular application servers. The system assigns to each web session a session ID, which encodes the IP addresses of the application server and its backup server, and provides an identifier that uniquely identifies the session within that application server. A session is automatically routed to a second application server to process a request if the application server handling the session should fail or not have the requested application. However, the request uses the original session ID. The second application server detects from the session ID that the session may have been handled by the first application server. The second application server decodes the IP address for the backup server for the first application server, and connects to that backup server. The user's session data is recovered from that backup server and reconstituted into a new session, with a new session ID. If the session had previously existed on the second application server, the session ID used by the second application server and the session data for that session are used, updated with the session data from the first backup server.

28 Claims, 9 Drawing Sheets

Figure 2

Status and Load Table:

| Application Server | Status | Probability |
|---|---|---|
| 1 | OK | 0.35 |
| 2 | OK | 0.50 |
| 3 | OK | 0.15 |

Session ID:

| |
|---|
| IP Address of Application Server |
| Unique Identifier Within Server |
| IP Address of Backup Server |

| Session ID Equivalents | |
|---|---|
| Session ID | Equivalent ID's |
| 1001 | 2002, 3004, 4001 |
| 1002 | 2005, 4008 |
| 2002 | 1001, 3004, 4001 |
| 2004 | |
| 2005 | 1002, 4008 |
| 3001 | |
| 3004 | 1001, 2002, 4001 |
| 4001 | 1001, 2002, 3004 |
| 4008 | 1002, 2005 |

INTERNET SERVER SESSION BACKUP APPARATUS

FIELD OF THE INVENTION

This invention relates to computer systems and, more particularly, to servers for Internet web sites.

BACKGROUND OF THE INVENTION

In the use of the Internet, users may contact an Internet web site to view or obtain information. The user's contact with the web site is typically with a web server, or Hyper Text Transfer Protocol (HTTP) server. Behind and supporting the web server is an application server. A web site intended to handle lots of demand may use multiple web servers and/or multiple application servers.

To a point, adding an application server allows the system to be scaled to handle increased use. Theoretically, the system would scale linearly. For example, by doubling the hardware for the application servers, the system capacity would be doubled. However, known scalability models do not provide linear scaling.

At some point, adding hardware will not add capacity and may decrease capacity due to needed cross-communication between the application servers. Typically, each new application server increases the amount of cross-communication required to handle a request, thereby decreasing the overall efficiency of the system. Consequently, decreasing the amount of cross-communication is very important for achieving high degrees of scalability.

The Dynamo 3.0 application server, provided by the Art Technology Group, Boston, Massachusetts, the assignee of the present application, achieves a near-linear scalability through the use of session-based load-balancing techniques. When a new user enters the web site for the first time, she is assigned a particular Dynamo application server, which will host the duration of her session. The assignment of the application server is made through a weighted random selection according to load, so that lightly-loaded application servers are more likely to get new sessions.

A problem with session-based load balancing mechanisms is that the failure of an application server results in the loss of the information for the user session being hosted by the failed server. In order to recover from a failure and to "fail over" to a new server, the session data must be saved on another machine or otherwise outside the application server, so that it can be restored to another server.

In some existing application server designs, this problem is addressed by broadcasting the session data on each application server to each of the other application servers. However, this significantly increases the amount of cross-communication, thereby greatly decreasing the scalability of the system.

SUMMARY OF THE INVENTION

According to the present invention, session data is saved through the use of a third tier of servers, in addition to the web (or HTTP) server(s) and the application server(s). This third tier of servers, or backup servers, is responsible for backing up the session data. The system assigns to each session a session ID. The session ID encodes the IP addresses of the backup server and the application server, as well as a unique identifier for the session, so that when a session is switched to another application server the switch can be detected by the new application server and the session data can be retrieved from the backup server.

Each application server is assigned to a single backup server. Each backup server may serve data for one or more application servers. As session data is modified, the data is backed up to the backup server. If an application server should fail, the request is automatically routed to another application server as if it were a new session. However, the request uses the original session ID. The new application server detects that the request may be from a failed session because, for example, the server is not currently hosting a session with that session ID. The new application server extracts the backup server's IP address, encoded in the session ID, and connects to the backup server. The application server requests the backed-up data corresponding to the session ID. If the data is available, then the new application server knows that the request came from a failed session, and reconstitutes the backed up data into a new session with a new session ID.

Alternatively, the invention can be used in the absence of the failure of an application server, to transfer a user session from one application server to a different application server and back, without losing session data.

BRIEF DESCRIPTION OF THE DRAWINGS

FIG. 2 is a diagram of a structure for implementing a computer system according to an embodiment of the present invention.

FIG. 3 is a diagram of a data structure for implementing a computer system according to an embodiment of the present invention.

FIG. 8 is a diagram of a data structure for implementing a computer system according to an embodiment of the present invention.

DETAILED DESCRIPTION OF PREFERRED EMBODIMENTS

Figure 1:
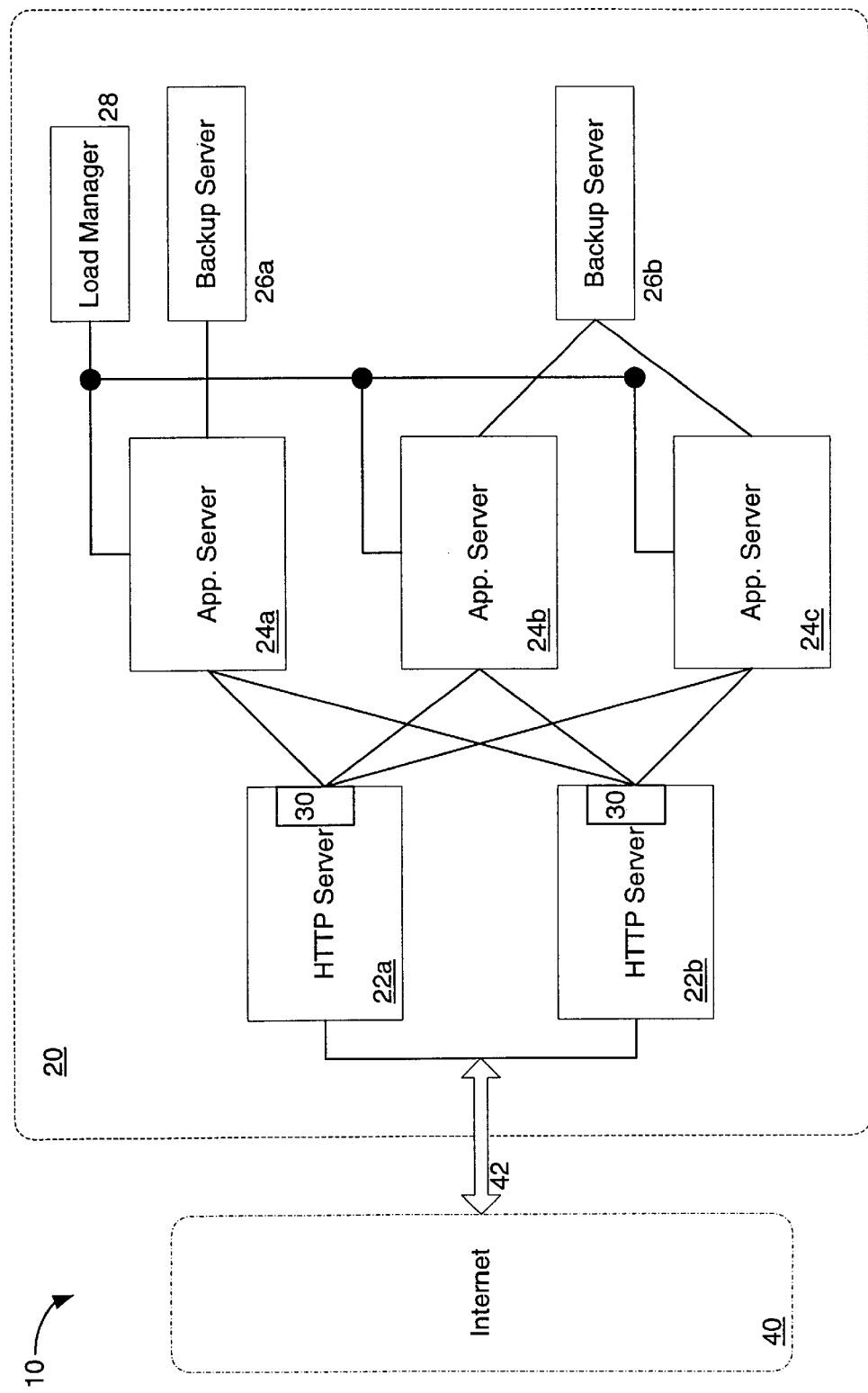
FIG. 1 is a block diagram of a computer system according to an embodiment of the present invention.

Referring to FIG. 1, portions of a computer network 10 are shown. The server portions 20 of a web site connect to the Internet (shown in block form as block 40) over connection 42. As will be described further below, the server portions 20 include HTTP servers 22 (designated as 22a and 22b), application servers 24 (designated as 24a, 24b, and 24c), backup servers 26 (designated as 26a and 26b), and load manager 28. Each HTTP server 22 includes connection module 30. Although HTTP servers 22 and application servers 24 are shown separately, it is understood that the same processor could provide both an HTTP server and an application server.

Users communicate most directly with an HTTP server 22. In one embodiment, users initially communicate with main HTTP server 22a. Main HTTP server 22a handles some requests itself and redirects other user requests to secondary HTTP server 22b. Although two HTTP servers 22 are shown in FIG. 1, it is understood that only one HTTP server 22 could be used, or more than two could be used. Alternatively, with two or more HTTP servers 22, a DNS server (which could be part of one of the HTTP servers 22) could maintain a pool of IP addresses that identify the HTTP servers, and assign an IP address to service each new user request. Suitable HTTP servers include the Netscape SuiteSpot or FastTrack HTTP servers, or the Microsoft IIS server.

Connection modules 30 are used to connect each HTTP server 22 to each application server 24. Preferably, the same application server 24 handles all requests for a particular user session. Although three application servers 24 are shown in FIG. 1, it is understood that fewer or more application servers 24 could be used, depending on the needs of the system. More than one HTTP server 22 can send requests to the same application server 24.

In one preferred embodiment, each application server 24 has the same content, and the load is distributed among them. Load manager 28 periodically polls each application server 24 for status and load information. This information is compiled into a table 100 (shown in FIG. 2), which is available to the connection modules 30. Preferably, table 100 provides a set of probabilities, based on the status and load information, as to whether to select each application server 24. A more heavily loaded application server receives a lower probability (for example, Application Server No. 3, shown in FIG. 2) and is less likely to be selected. Although a single load manager 28 is shown, multiple load managers may be active at once. A connection module 30 may obtain the information in table 100 from any active load manager, thereby providing fault-tolerance should one load manager fail. In a preferred embodiment each application server 24 contains a load manager module.

When an HTTP server 22 receives a request without a session ID 110 (discussed in detail below), which indicates the start of a new session, the corresponding connection module 30 uses the information from table 100 to select an application module 24 to use for the new session. The application module 24 assigns a new session ID to the new session. The assignment of the application server 24 is made through a weighted random selection according to load (reflected by the probabilities in table 100), so that lightly-loaded application servers 24 are more likely to get new sessions. Once assigned, the session ID 110 (and corresponding particular application server 24) is used throughout the duration of the session.

The session ID 110 is attached to all subsequent page requests either through the request URL or through a standard HTTP cookie. As shown in FIG. 3, the session ID 110 encodes the IP address of the application server 24 that hosts the session, an identifier that uniquely identifies the session within that application server, and the IP address of the backup server 26 assigned to that application server. Preferably, this information is encoded as a single stream of characters containing the information. Subsequent requests are then routed directly back to the assigned application server 24 without involving any of the other application servers.

Through this mechanism, the only cross-communication among the application servers 24 is that generated by the load manager 28, in monitoring the loading of each application server 24 to update the table 100. This communication level is relatively low and may be negligible for up to at least hundreds of application servers.

Each application server 24 is assigned to a single backup server 26. As shown in FIG. 1, a backup server 26 may be assigned to a single application server 24 or to multiple application servers 24. During a session, application server 24 maintains as session data elements of the application server that are user-specific transient, or highly mutable. These may include the user's customer identification number for reference in a customer database, a "shopping cart" of items waiting to be purchased by the user, or profile traits, such as an inferred "interest in sports" trait determined by the number of times the user has visited sports pages in the web site. As session data is modified, the data is backed up to the assigned backup server 26.

Figure 4:
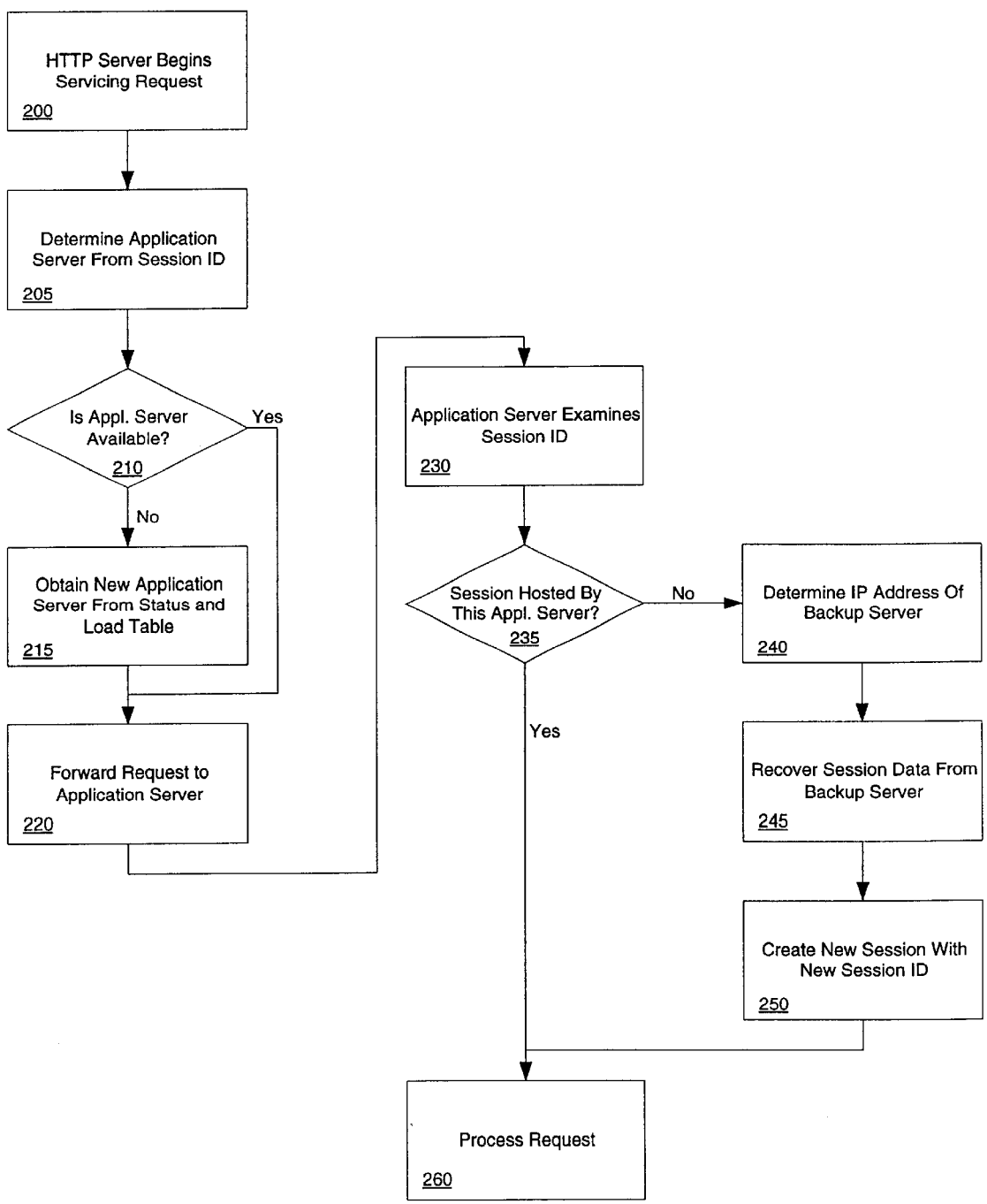
FIG. 4 is a flow diagram of processing steps performed by a computer system according to an embodiment of the present invention.

As shown in FIG. 4, when an HTTP server 22 services a request (step 200), its connection module 30 uses the Session ID 110 to determine the application server 24 assigned to the session (step 205). For this example, it is assumed that application server 24a is assigned to the session. The connection module 30 then determines whether the assigned application server 24a is available (step 210). The connection module 20 may determine that the application server 24a is not available if it attempts to communicate with the application server and fails, or if it had previously attempted to communicate with the application server and failed, or if it had previously received notification from the load manager 28 that the application server is not available. As long as the assigned application server 24a is available, the request is forwarded to that application server (step 220). If connection module 30 determines at step 210 that the assigned application server 24a is not available, connection module 30 obtains a new application server 24 (for this example, application server 24b) from table 100, previously obtained from load manager 28 (step 215), in the same manner that the application server 24a initially was assigned. However, the request to the new application server 24b (at step 220) uses the original session ID 110.

The new application server 24b receives the request and examines the session ID 110 (step 230). At step 235, the application server 24b determines if it is hosting a session corresponding to the session ID 110. Preferably, this is done by comparing the session ID to a list of session ID's currently being hosted by the application server 24b, where each application server 24 maintains a list of the session ID's it is currently hosting. Alternatively, to determine if it is hosting a session corresponding to the session ID 110, application server 24b could determine whether the IP address of the session ID 110 corresponds to that application server 24b or another application server 24 (e.g., application server 24a or application server 24c).

If application server 24b is not hosting the session corresponding to session ID 110 (the "No" branch of step 235), the new application server 24b determines that the request may be from a failed session. Using the session ID, the new application server 24b determines the IP address of the backup server 26 for the originally assigned application server 24a (step 240). The new application server 24b then connects to the backup server 26 and recovers the user's session data (step 245). That session data is reconstituted into a newly created session, with a new session ID (step 250), so that subsequent requests will be routed directly to the newly assigned application server 24b. Once the new session has been created, the application server can process the request (step 260), in the same manner as the request would be processed if the backup server had not been used.

In an alternative embodiment (which can be implemented by itself or along with the failover embodiment described above), sessions can be migrated from one application server 24 to another application server 24 in the absence of a failure. In this embodiment, the application servers may be running different applications. For example, a session could begin with application server 24a, running one application, and be migrated to application server 24b, running a second application. This could occur, for example, in a situation where a company has two divisions —marketing/sales and customer support. These divisions may be run as completely separate organizations, so their web sites also are run separately. In this example, when the customer support site recommends that a customer fix a problem by applying a certain upgrade, the customer support site may include a link to the upgrade product on the marketing/sales site. When the customer takes the link, some elements of the customer's session, such as the customer ID or some other identification, should migrate to the marketing/sales site so that the customer does not need to "start over"upon entering that site. The link to the upgrade product is a full URL to the marketing/sales site, such as http://marketing.bigcorp.con/products/upgrade 3.1 jhtml The session ID 110 is included with the URL, so that the marketing/sales site can determine that it is receiving an incoming migrated session.

In the same manner as explained above, application server 24b determines from the session ID that the session started on application server 24a and the session data is on backup server 26a.

Figure 5:
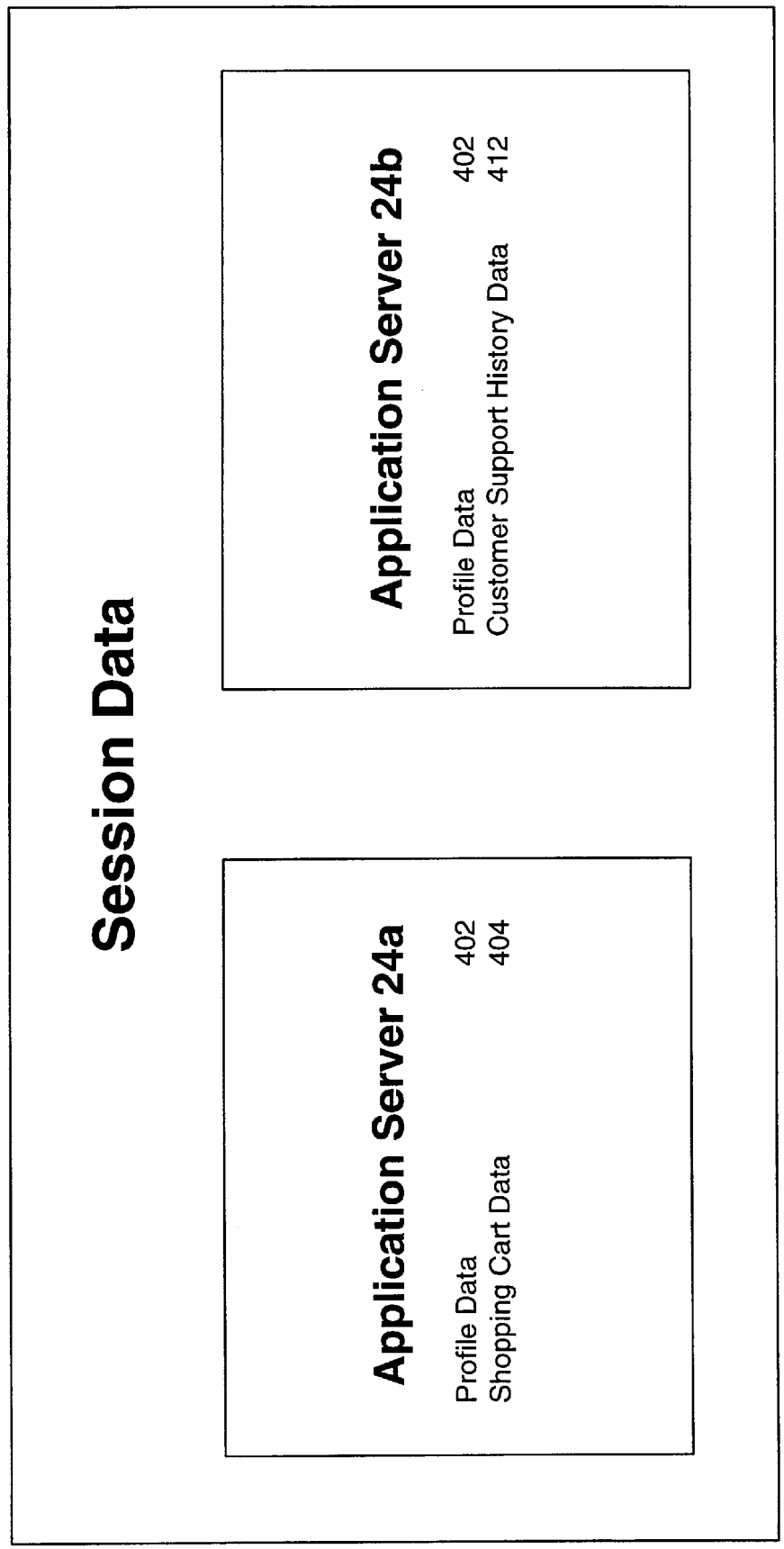
FIG. 5 is a diagram of data structures for implementing a computer system according to an embodiment of the present invention.

In one embodiment of this session migration, each application server maintains its own set of application-specific session data. For example, as shown in FIG. 5, application server 24a provides an electronic commerce application and maintains profile data 402 and shopping cart data 404, and application server 24b provides a customer support application and maintains profile data 402 and customer support history data 412. Backup server 26a, serving application server 24a, maintains copies of profile data 402 and shopping cart data 404 for each session on application server 24a. Backup server 26b, serving application server 24b, maintains copies of profile data 402 and customer support history data 412 for each session on application server 24b.

Figure 6:
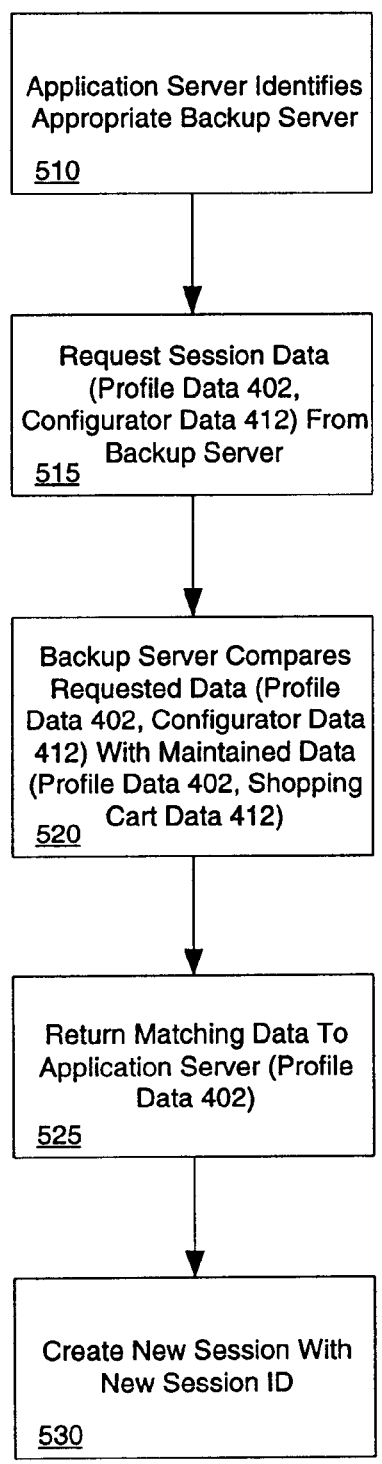
FIG. 6 is a flow diagram of processing steps performed by a computer system according to an embodiment of the present invention.

When a user migrates from the application on application server 24a to the application on application server 24b, application server 24b determines from the session ID that the session data can be obtained from backup server 26a. This is the same process as described above for FIG. 4. As shown in FIG. 6, after application server 24b has identified the appropriate backup server (at step 510), application server 24b requests from backup server 26a the session data that it maintains—in this case, profile data 402 and customer support history data 412 (step 515). Backup server 26a compares the data it maintains (in this case, profile data 402 and shopping cart data 404) to the requested data (step 520), and returns the data it has (in this case, profile data 402) (step 525). Application server 24b uses that data to start a new session, with a new session ID (step 530). With this embodiment, only the data of interest to both application servers needs to travel across the local server network. Alternatively, each application server and backup server could maintain all of the session data required by all of the application servers.

Figure 7:
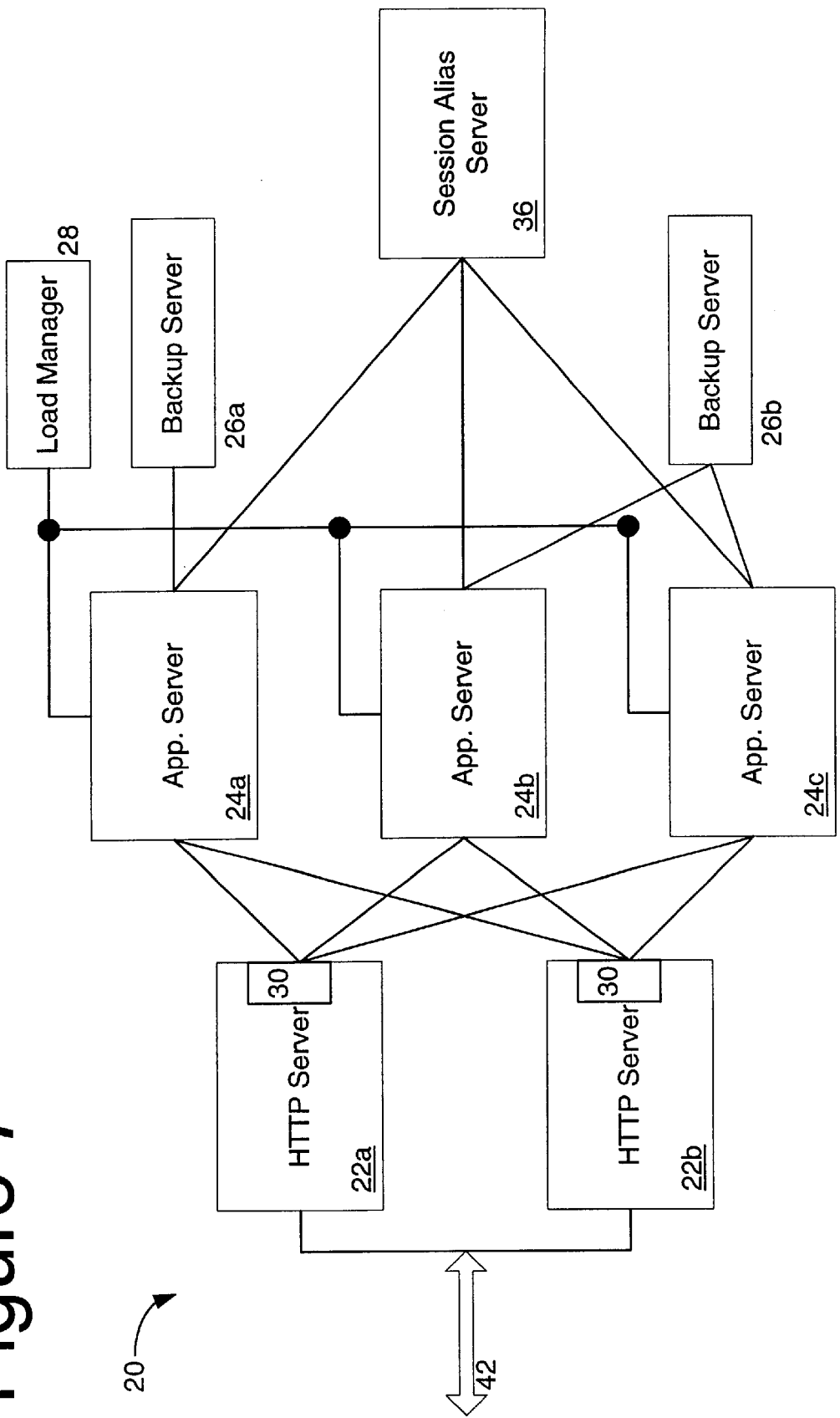
FIG. 7 is a block diagram of a computer system according to an embodiment of the present invention.

To permit the system to maintain the original session ID if the user subsequently migrates back to an application on application server 24a, the system may use a session alias server 36, as shown in FIG. 7, in addition to the structures described above with respect to FIG. 1. Session alias server 36 permits the system to determine the session ID on one application server 24 by which a user on another application server 24 is known. Session alias server 36 maintains a table, shown in FIG. 8, indicating the session IDs from different application servers 24 that are equivalent.

Figure 9:
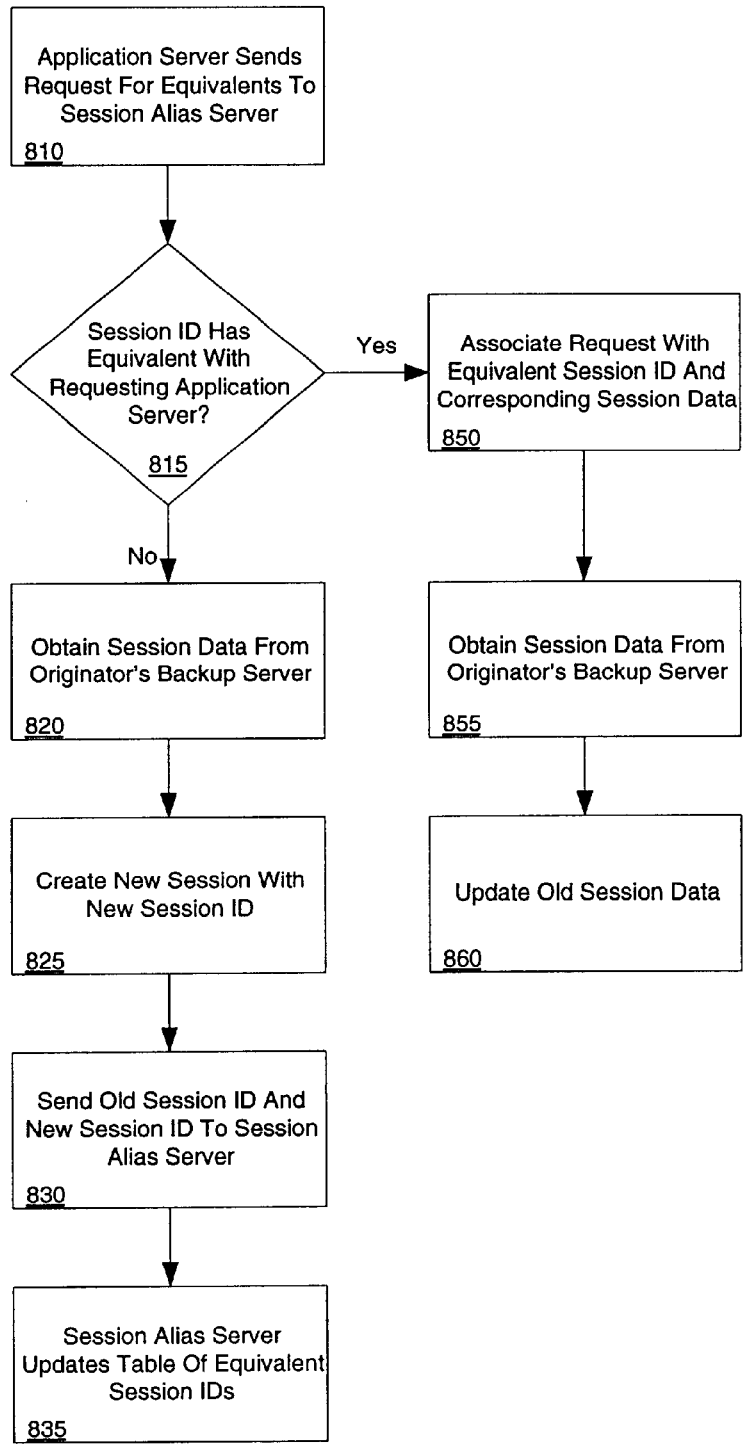
FIG. 9 is a flow diagram of processing steps performed by a computer system according to an embodiment of the present invention.

The use of the session alias server is illustrated in FIG. 9. Using the session alias server 36, after a session migrates (for example) from application server 24a to application server 24b, application server 24b asks session alias server 36 if the session ID it receives has an equivalent on application server 24b (step 810). Session alias server 36 can identify the corresponding application servers from the session IDs, which encode the identity of the application servers.

At step 815, if session alias server 36 determines there is no equivalent to the session ID on the requesting application server 24b, application server 24b requests session data from backup server 26a (step 820) and generates a new session ID (step 825). Application server 24b also sends to session alias server 36 the original session ID from application server 24a and the new session ID from application server 24b (step 830), so that session alias server 36 can create or update its table of equivalent session IDs (step 835).

If session alias server 36 determines at step 815 that there is an equivalent, application server 24b associates the request with the session ID on application server 24b that was identified by session alias server 36 and the corresponding session data (step 850), obtains the current session data from backup server 24a (step 855), and uses the current session data to update the old session data (step 860). Through this mechanism, a session can migrate from one application server to another and back again (either directly, or after moving to yet other application servers), while preserving session IDs and session data.

Figure 10:
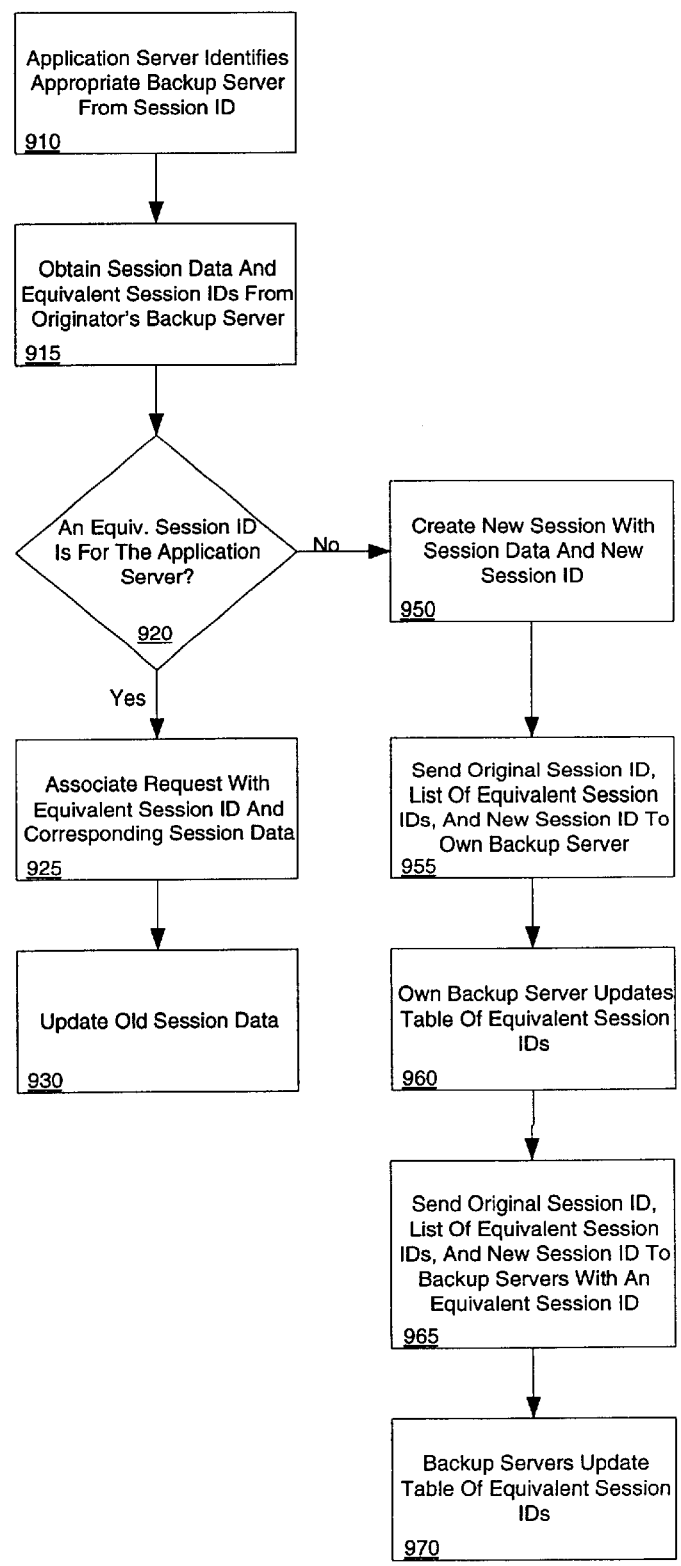
FIG. 10 is a flow diagram of processing steps performed by a computer system according to an embodiment of the present invention.

Instead of using a session alias server, the information that would have been maintained by the session alias server can be maintained by the backup servers 26. In this embodiment, shown in FIG. 10, when application server 24b receives an unknown session ID and determines the corresponding application server (24a) and backup server (26a) for that session ID (step 910), it asks backup server 26a for the backup information and for a list of equivalent session IDs (step 915).

If application server 24b determines (at step 920) that any of the equivalent session IDs are for application server 24b, application server 24b associates the request with the identified session ID on application server 24b and the corresponding session data (step 925) and, at step 930, updates the session data with the backup data from backup server 26a (which had been obtained at step 915).

If application server 24b determines at step 920 that none of the equivalent session IDs are for application server 24b (indicating that the user had not previously used application server 24b), application server 24b creates a new session ID and uses the session data it obtained from backup server 26a (step 950). In addition, application server 24b sends to its backup server 26b the new session ID, the session ID it originally received, and any equivalent session IDs it obtained from backup server 26a (step 955). Backup server 26b is thus able to update its table of equivalent session IDs (step 960). Application server 26b may then update the equivalence information on the other backup servers for which there is an equivalent session ID, by sending to those backup servers the new session ID (step 965). Those backup servers then update their tables of equivalent session IDs (step 970). This process avoids the need for an extra server, but requires additional communications with the backup servers.

While there have been shown and described examples of the present invention, it will be readily apparent to those skilled in the art that various changes and modifications may be made therein without departing from the scope of the invention as defined by the appended claims. For example, the invention typically may be used in a situation in which a session from a first application server is assigned to a second application server, and the second application server determines that it is not hosting a session corresponding to the session ID. However, the invention also may be used in the situation in which a session initially is running on one application server, and after a failure and recovery of the application server, the session continues on the application server. If the failure and recovery of the application server cause it no longer to have a record that it is hosting the session it can nonetheless recover the session data from the backup server. Accordingly, the invention is limited only by the following claims and equivalents thereto.

What is claimed is:

1. A computer system comprising:
    a plurality of application servers, wherein each of the plurality of application servers is programmed to maintain session data for a user session assigned to such application server; and
    a backup server coupled to the application servers;
    wherein the backup server is programmed to maintain a backup of the session data for a first of the application servers;
    wherein a second of the application servers is programmed to obtain the backup of session data from the backup server when the second of the application servers receives a request for service not corresponding to a user session hosted by the second of the application servers; and
    wherein the transition of the backup session data from the first server to the second server is transparent to the user.

2. The computer system of claim 1, wherein each of the plurality of application servers is programmed to assign a session ID to a user session not previously assigned to such application server.

3. The computer system of claim 2, wherein the session ID provides a unique identifier for the user session.

4. The computer system of claim 2, wherein the session ID identifies the application server to which the user session is assigned.

5. The computer system of claim 4, wherein the session ID further identifies the backup server.

6. The computer system of claim 4, wherein the second of the application servers is programmed to assign a new session ID to the user session if the second of the application servers is not hosting a user session with the session ID.

7. The computer system of claim 6, wherein the new session ID identifies the second of the application servers and provides a unique identifier for the user session.

8. The computer system of claim 4, wherein the second of the application servers is programmed to assign a new session ID to the user session if the session ID does not identify the second of the application servers, the new session ID identifying the second of the application servers.

9. The computer system of claim 1, wherein the second of the application servers is programmed to replace the session ID with a new session ID if the second of the application servers receives a request for service not corresponding to a user session hosted by the second of the application servers, wherein the new session ID identifies a user session assigned to the second of the application servers.

10. The computer system of claim 9, further comprising a session alias server coupled to the plurality of application servers, wherein the session alias server is programmed to maintain a table indicating equivalence of session IDs from different ones of the plurality of application servers.

11. The computer system of claim 9, wherein the backup server is programmed to maintain a table indicating equivalence of session IDs from different ones of the plurality of application servers.

12. The computer system of claim 11, wherein the second of the application servers is programmed to obtain from the backup server a list of equivalent session IDs to the current session ID of the user session, and to determine whether the list of equivalent session IDs includes a session ID corresponding to the second of the application servers.

13. The computer system of claim 1, further comprising a web server coupled to the plurality of application servers, wherein the web server is programmed to route requests for service from the user session to the first of the plurality of application servers.

14. The computer system of claim 13, wherein the web server is programmed to route a request for service from the user session to the second of the application servers when the first of the application servers has failed.

15. The computer system of claim 14, further comprising a load manager coupled to the plurality of application servers, wherein the load manager is programmed to obtain load information from the plurality of application servers.

16. A computer system comprising:
    a web server;
    a plurality of application servers coupled to the web server, wherein a user session is assigned to one of the plurality of application servers and the one of the plurality of application servers maintains session data for the user session; and
    a group of at least one backup server coupled to the application servers;
    wherein each application server is assigned to one backup server from the group of backup servers, and each backup server in the group of backup servers is programmed to maintain a backup of the session data for at least one of the application servers;
    wherein a user session assigned to a first of the application servers is assigned a session ID;
    wherein the second of the application servers assigns a different session ID to the user session;
    wherein a second of the application servers is programmed to obtain the backup of session data from the backup server to which the first of the application servers is assigned when the second of the application servers receives a request for service from the web server, the request for service not corresponding to a user session hosted by the second of the application servers; and
    wherein the transition of the backup session data from the first server to the second server is transparent to the user.

17. A method for transferring a session on a computer network comprising the steps of:
    assigning a user session to a first application server;
    assigning a first session ID to the user session;
    sending a request for service to a second application server, the request for service including the first session ID;
    determining whether the request for service corresponds to a user session hosted by the second application server;

retrieving session data for the user session from a backup server assigned to the first application server;

assigning a second session ID to the user session; and wherein the retrieval of the session data from the first server to the second server is transparent to the user.

18. The method of claim 17, wherein the retrieving step includes identifying, from the first session ID, the backup server assigned to the first application server.

19. The method of claim 17, wherein the step of assigning a second session ID includes determining whether the user session had previously been assigned to the second application server.

20. The method of claim 19, wherein the step of determining whether the user session had previously been assigned to the second application server includes obtaining a list of session IDs that are equivalent to the first session ID.

21. The method of claim 20, wherein the list of session IDs is obtained from the backup server assigned to the first application server.

22. The method of claim 20, wherein the list of session IDs is obtained from a session alias server.

23. The method of claim 20, further comprising the step of providing to a backup server assigned to the second application server the second session ID, the first session ID, and the list of session IDs that are equivalent to the first session ID, if the user session had not previously been assigned to the second application server.

24. The method of claim 23, further comprising the step of providing to the backup server assigned to the first application server the second session ID, if the user session had not previously been assigned to the second application server.

25. The method of claim 19, wherein the step of assigning a second session ID further includes re-assigning a session ID previously assigned to the user session for the second application server if the user session had previously been assigned to the second application server.

26. The method of claim 25, further comprising the step of recovering session data corresponding to the period during which the user session had been assigned to the second application server.

27. The method of claim 26, further comprising the step of updating the recovered session data with the session data retrieved from the backup server.

28. A computer system comprising:

an application server programmed to maintain session data for user sessions assigned to the application server and to assign a session ID to each user session assigned to the application server; and a backup server coupled to the application server, wherein the backup server is programmed to maintain a backup of session data for a user session on the computer system;

wherein the application server is programmed to obtain from the backup server the backup of session data for the user session if the application server is not hosting the user session;

wherein the application server is programmed to determine if the application server is not hosting the user session by comparing the session ID of the user session to a list of session ID's currently being hosted by the application server; and wherein the transfer of session data to the application server is transparent to the user.

* * * * *